US012700381B1

(12) United States Patent
Chen et al.

(10) Patent No.: US 12,700,381 B1
(45) Date of Patent: Aug. 4, 2026

(54) MULTISTABLE DISPLAY WITH PARTIAL UPDATE MODE

(71) Applicant: GENETOUCH CORP., Taoyuan City (TW)

(72) Inventors: Cheng-Yu Chen, Taoyuan City (TW); Ching-Lung Li, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/317,471

(22) Filed: Sep. 3, 2025

(30) Foreign Application Priority Data

Apr. 1, 2025 (TW) ................................ 114112627

(51) Int. Cl.
*G09G 3/36* (2006.01)
*G09G 3/20* (2006.01)

(52) U.S. Cl.
CPC ......... *G09G 3/3629* (2013.01); *G09G 3/2092* (2013.01); *G09G 2310/04* (2013.01); *G09G 2310/061* (2013.01); *G09G 2310/08* (2013.01); *G09G 2320/0242* (2013.01)

(58) Field of Classification Search
CPC ............... G09G 3/3629; G09G 3/2092; G09G 2310/04; G09G 2310/061; G09G 2310/08; G09G 2310/0242
See application file for complete search history.

(56) References Cited

U.S. PATENT DOCUMENTS

2011/0018857 A1* 1/2011 Lai ......................... G09G 3/344
345/213

* cited by examiner

*Primary Examiner* — Priyank J Shah
(74) *Attorney, Agent, or Firm* — Birch, Stewart, Kolasch & Birch, LLP

(57) ABSTRACT

A multistable display with a partial update mode refreshes partial image of a display panel unit without affecting a color difference of other pixels in the same row by outputting a pixel-electrode hold signal and a line-electrode hold signal to a pixel electrode and a line electrode corresponding to a holding pixel. Therefore, a problem of partial brightness and color difference caused by refreshing the partial image can be mitigated.

10 Claims, 17 Drawing Sheets

圖 10A
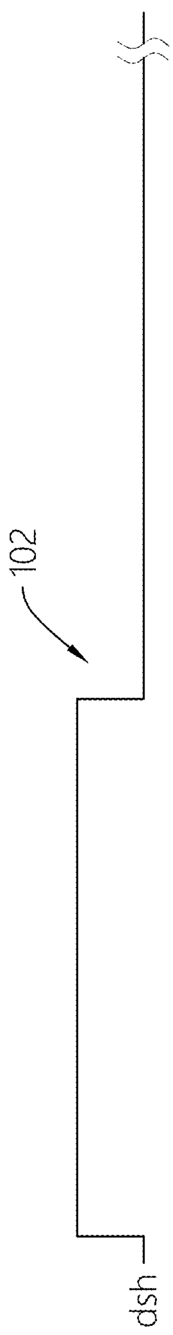
FIG.10B
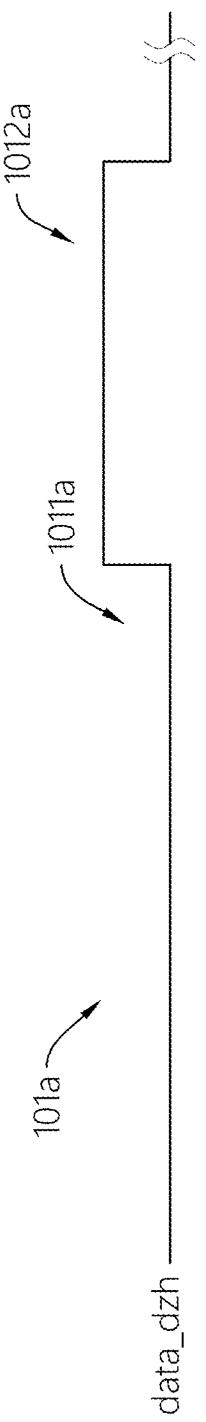
圖 10C
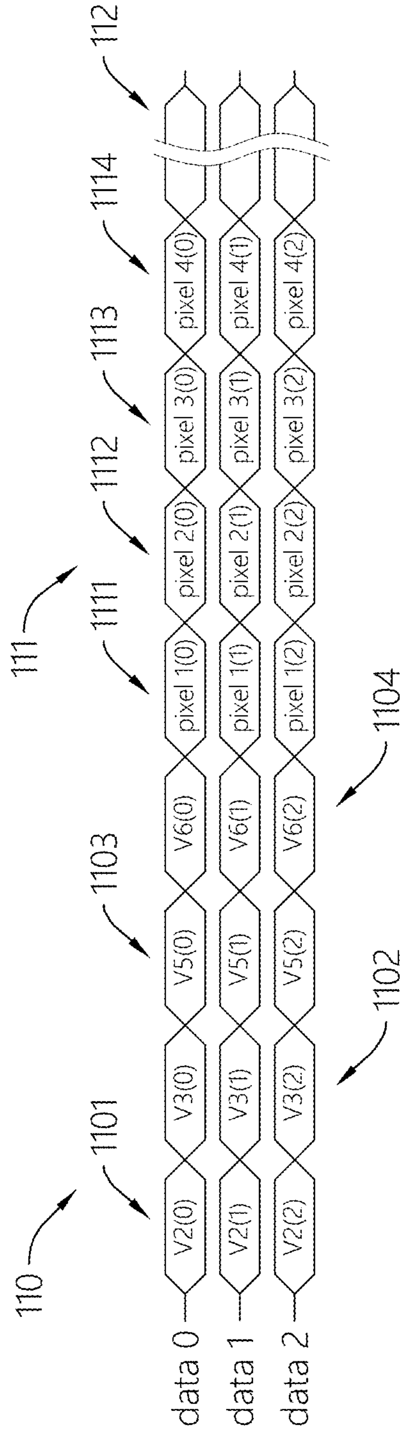

MULTISTABLE DISPLAY WITH PARTIAL UPDATE MODE

CROSS-REFERENCE TO RELATED APPLICATION(S)

This application claims the priority benefit of TW application serial No. 114112627 filed on Apr. 1, 2025, the entirety of which is hereby incorporated by reference herein and made a part of the specification.

BACKGROUND OF THE INVENTION

1. Field of the Invention

The present invention relates to a display, more particularly a multistable display with a partial update mode.

2. Description of the Related Art

A conventional multistable display, such as a cholesteric liquid crystal display (ChLCD), has liquid crystals with bistable displaying properties. As such, various sets of different voltages are required to drive the conventional multistable display for displaying a frame. With reference to FIG. 16, FIG. 16 is a schematic view of a panel structure of the ChLCD. The ChLCD includes a display panel unit 30*a*, which is a passive matrix composed of a plurality of pixel electrodes 31*a*, such as columns 1 to M, and a plurality of line electrodes 32*a*, such as rows 1 to N, which are arranged in rows and columns. Each intersection crossed by each pixel electrode 31*a* and each line electrode 32*a* forms a respective pixel. Namely, each pixel corresponds to one of the pixel electrodes 31*a* and one of the line electrodes 32*a*. As shown in FIG. 16, the display panel unit 30*a* includes M pixel electrodes 31*a* and N line electrodes 32*a*. The display panel unit 30*a* may be driven by a driver circuit unit (IC), and the driver IC May output a plurality of line electrode driver signals to the line electrodes 32*a*. For example, a driver circuit unit 20*a* electrically connected to the display panel unit 30*a* may output a plurality of pixel electrode driver signals and the line electrode driver signals to the pixel electrodes 31*a* and the line electrodes 32*a* to refresh an image of the display panel unit 30*a* by scanning.

The ChLCD has bistable characteristics. Namely, the ChLCD has two stable states. One of the stable states is Planar State, and the other one is Focal-Conic State. In the Planar State, liquid crystals of the ChLCD are neatly arranged, and the liquid crystals can reflect light with a specific wavelength. The Planar State is usually called a bright state. In the Focal-Conic State, the liquid crystals of the ChLCD are arranged in a disordered manner, and the liquid crystals will scatter incident light. The Focal-Conic State is usually called a dark state. Normally, when the driver circuit unit 20*a* partially refreshes the image of the display panel unit 30*a*, the driver circuit unit 20*a* refreshes the image in a row-by-row refreshing. Namely, the driver circuit unit 20*a* outputs the line electrode driver signals to the line electrode 32*a* corresponding to the pixels to be refreshed row by row. While refreshing the image of the display panel unit 30*a* row by row, the driver circuit unit 20*a* simultaneously outputs the pixel electrode driver signals to the pixel electrode 31*a* corresponding to the pixels to be refreshed, thereby performing row-by-row refreshing. With reference to FIG. 17, for the sake of convenience, the pixel electrodes 31*a* and the line electrodes 32*a* of the display panel unit 30*a* shown in FIG. 16 are simply divided into blocks of a nine-square grid. Each block of the nine-square grid can be regarded as a pixel or a block composed of a plurality of pixels. Blocks A, B, C are regarded as the line electrodes 32*a* in the same row. Further, blocks D, E, F and blocks G, H, I are also respectively regarded as the line electrodes 32*a* in the same row. Similarly, blocks A, D, G, blocks B, E, H and blocks C, F, I are respectively regarded as the pixel electrodes 31*a* in the same row. For example, when the driver circuit unit 20*a* partially refreshes the image of the display panel unit 30*a*, the driver circuit unit 20*a* refreshes the image in the row-by-row scanning manner. In the nine-square grid shown in FIG. 17, blocks D and F are located in the same line electrode 32*a* as block E. When block E is refreshed, blocks D and F may also be affected, and thereby color of blocks D and F may be changed. Further, block D may cause a color difference with blocks A and G, and block F may also cause a color difference with blocks C and I.

Therefore, how to provide a multi-stable display device to mitigate color difference has become a topic in need of research.

SUMMARY OF THE INVENTION

The present invention discloses a multistable display with a partial update mode. The multistable display includes a timing controller circuit unit (TCON), a display panel unit (Panel), and a driver circuit unit (Driver IC).

The timing controller circuit unit generates a timing control signal. The display panel unit includes a plurality of pixel electrodes and a plurality of line electrodes, and each intersection crossed by each pixel electrode and each line electrode forms a respective pixel. The pixels include at least one updating pixel and at least one holding pixel. The driver circuit unit is connected to the timing controller circuit unit and the display panel unit to receive the timing control signal. The driver circuit unit generates a plurality of pixel electrode driver signals to the pixel electrodes of the display panel unit, and generates a plurality of line electrode driver signals to the line electrodes of the display panel unit.

The timing control signal includes a partial update control signal, a plurality of data signals, and a plurality of scan signals. The data signals include a plurality of pixel waveform data, and the pixel waveform data respectively correspond to the pixel electrodes. The scan signals include a plurality of line waveform data, and the line waveform data respectively correspond to the line electrodes. The partial update control signal includes at least one update control signal and at least one hold control signal. The update control signal corresponds to the pixel waveform data of the pixel electrode of the updating pixel, and corresponds to the line waveform data of the line electrode of the updating pixel. The hold control signal corresponds to the pixel waveform data of the pixel electrode of the holding pixel, and corresponds to the line waveform data of the line electrode of the holding pixel. The pixel electrode driver signals include at least one pixel electrode refreshing signal and at least one pixel-electrode hold signal. The line electrode driver signals include at least one line electrode refreshing signal and at least one line-electrode hold signal.

The driver circuit unit outputs the pixel electrode refreshing signal to the pixel electrode of the updating pixel, and outputs the line electrode refreshing signal to the line electrode of the updating pixel. The driver circuit unit outputs the pixel-electrode hold signal to the pixel electrode of the holding pixel, and outputs the line-electrode hold signal to the line electrode of the holding pixel. A voltage difference between update signals on the updating pixel is greater than or equal to a threshold voltage required to change a pixel state. The update signals on the updating pixel may include the pixel electrode refreshing signal and the line electrode refreshing signal on the updating pixel.

As described above, the multistable display of the present invention can refresh partial image of the display panel unit without affecting a color difference of other pixels in the same row by outputting the pixel-electrode hold signal and the line-electrode hold signal to the pixel electrode and the line electrode corresponding to the holding pixel. Therefore, a problem of partial brightness and color difference caused by refreshing the partial image can be mitigated.

BRIEF DESCRIPTION OF THE DRAWINGS

FIG. 10A is a schematic view of the header setting signal of the multistable display of the present invention.

FIG. 10B is a schematic view of the data partial update control signal of the multistable display of the present invention.

FIG. 10C is a schematic view of the pixel waveform data of the multistable display of the present invention.

DETAILED DESCRIPTION OF THE INVENTION

Figure 1:
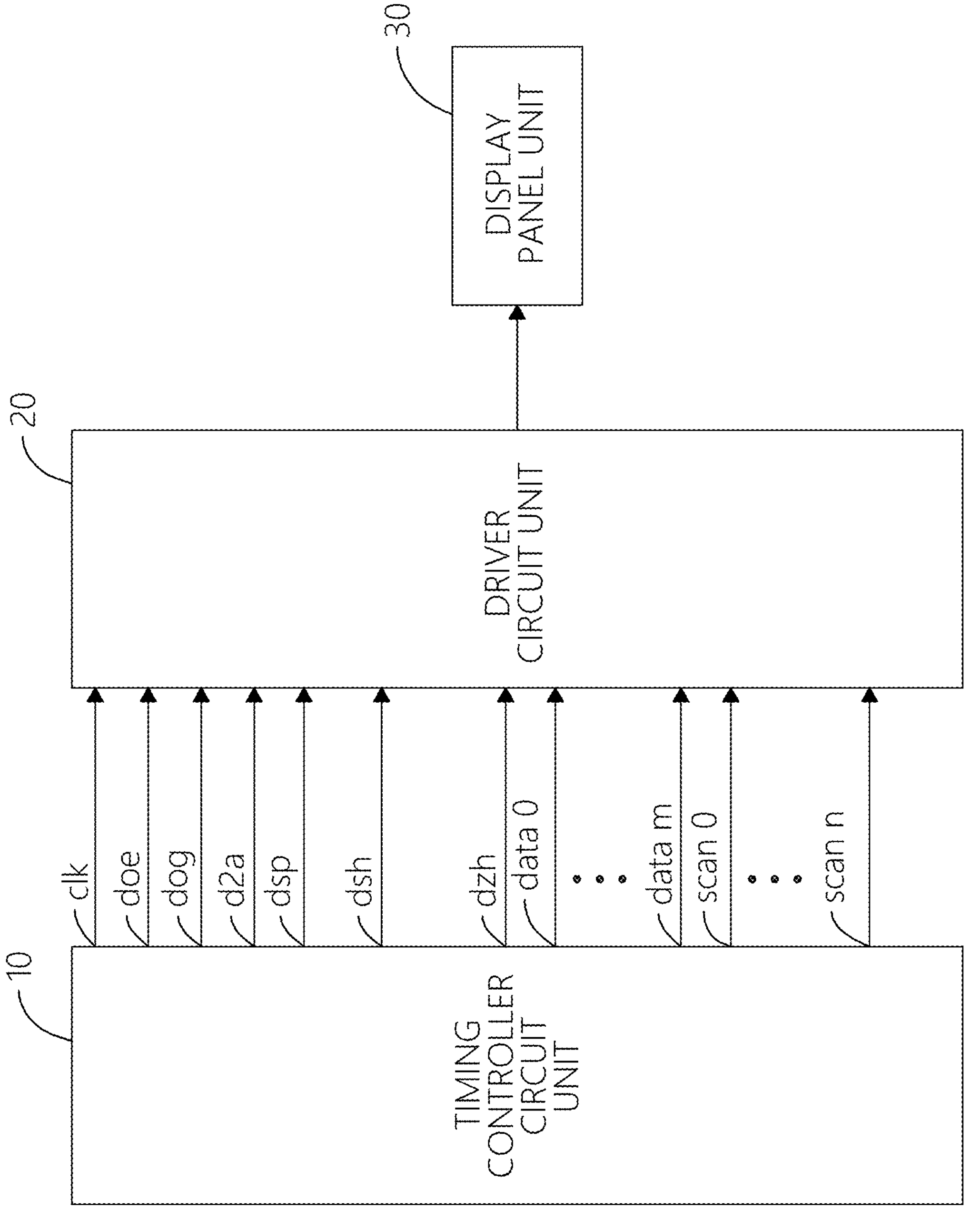
FIG. 1 is a block diagram of a first embodiment of a multistable display of the present invention.
Figure 2:
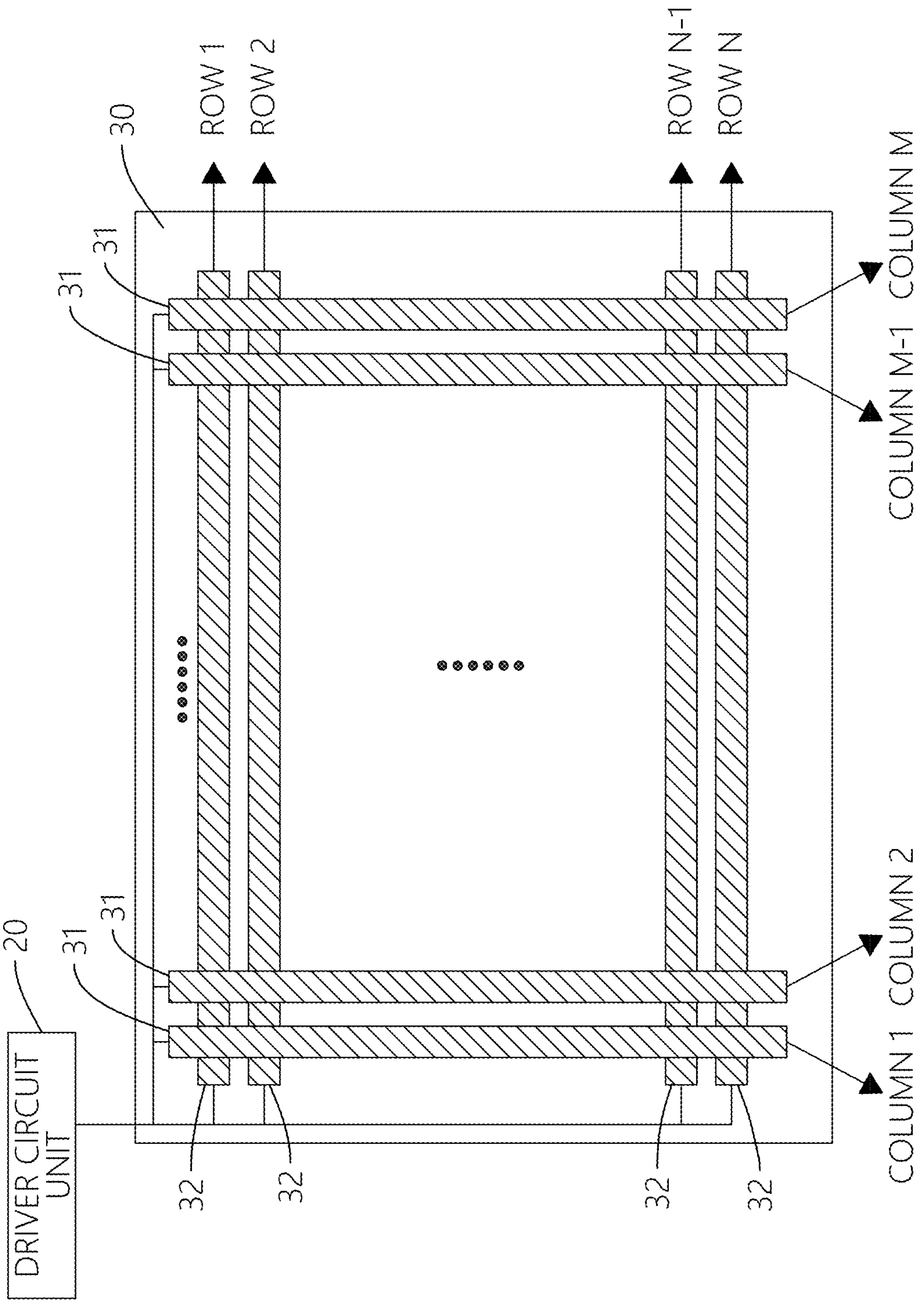
FIG. 2 is a schematic view of a panel structure of the multistable display of the present invention.

With reference to FIGS. 1 and 2, the present invention is a multistable display with a partial update mode. The multistable display includes a timing controller circuit unit 10, a driver circuit unit 20, and a display panel unit 30. The timing controller circuit unit 10 generates a timing control signal. The display panel unit includes a plurality of pixel electrodes 31 and a plurality of line electrodes 32, and each intersection crossed by each pixel electrode 31 and each line electrode 32 forms a respective pixel. The pixels include at least one updating pixel and at least one holding pixel. The driver circuit unit 20 is connected to the timing controller circuit unit 10 and the display panel unit 30 to receive the timing control signal. The driver circuit unit 20 generates a plurality of pixel electrode driver signals to the pixel electrodes 31 of the display panel unit 30, and generates a plurality of line electrode driver signals to the line electrodes 32 of the display panel unit 30.

In an embodiment, the timing controller circuit unit 10 includes a clock (clk) signal output port, a display output enable (doe) control port, a display output ground (dog) control port, and a display start pulse (dsp) control port. The clk signal output port, the doe control port, the dog control port, and the dsp control port of the timing controller circuit unit 10 are functionally identical with those on a timing controller circuit unit of the conventional multistable display described in the prior art, and thus further detailed description is omitted. In addition, the timing controller circuit unit 10 further includes a plurality of data output ports, such as a first to an $(m+1)^{th}$ data output port (data 0-*m*), and a plurality of scan output ports, such as a first to an $(n+1)^{th}$ scan output port (scan 0-*n*).

Figure 3A:
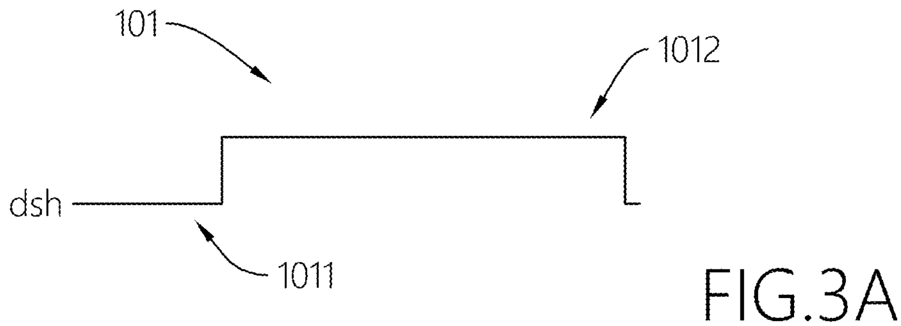
FIG. 3A is a schematic view of a partial update control signal of the multistable display of the present invention.
Figure 3B:
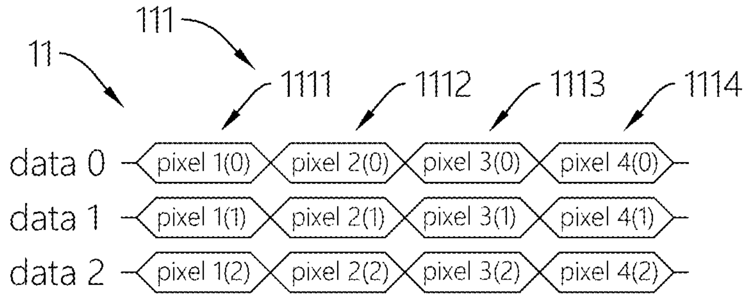
FIG. 3B is a schematic view of a pixel waveform data of the multistable display of the present invention.
Figure 3C:
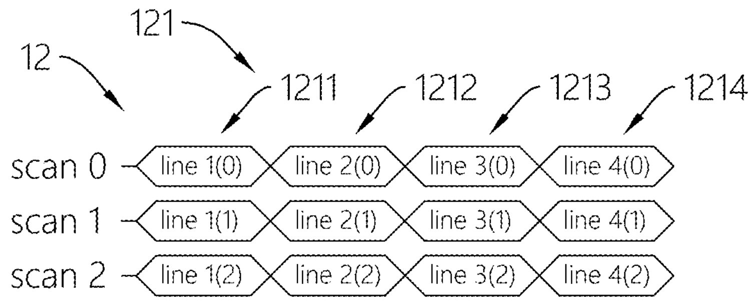
FIG. 3C is a schematic view of a line waveform data of the multistable display of the present invention.

With reference to FIGS. 3A to 3C, the timing control signal includes a partial update control signal 101, a plurality of data signals 11, and a plurality of scan signals 12. The data signals 11 include a plurality of pixel waveform data 111, and the pixel waveform data 111 respectively correspond to the pixel electrodes 31. The scan signals 12 include a plurality of line waveform data 121, and the line waveform data 121 respectively correspond to the scan electrodes 32. In the embodiment, the timing controller circuit unit 10 further includes a partial update signal control port (dzh), and the partial update signal control port (dzh) outputs the partial update control signal 101.

For example, with reference to FIG. 3B, the data signals 11 include a first to a third data signal (data 0-2). The pixel waveform data 111 include a first to a third pixel waveform data 1111-1113. The first to third pixel waveform data 1111-1113 respectively correspond to the pixel electrodes 31 of a first to a third column. The first pixel waveform data 1111 of the first to third data signals (data 0-2) is pixel 1 (0)-(2), and corresponds to the pixel electrode 31 of the first column. The pixel 1 (0), the pixel 1 (1), and the pixel 1 (2) are each 1-bit information, and can be combined into a 3-bit binary code. For example, the pixel 1 (0), the pixel 1 (1), and the pixel 1 (2) can be combined into the 3-bit binary code "100", which represents four in decimal.

Similarly, with reference to FIG. 3C, the scan signals 12 include a first to a third scan signal (scan 0-2). The line waveform data 121 include a first to a third line waveform data 1211-1213. The first to third line waveform data 1211-1213 respectively correspond to the line electrodes 32 of a first to a third row. The first line waveform data 1211 of the first to third scan signals (scan 0-2) is line 1 (0)-(2), and corresponds to the line electrode 32 of the first row. The line 1 (0), the line 1 (1), and the line 1 (2) are 1-bit information each, and can be combined into a 3-bit binary code. For example, the line 1 (0), the line 1 (1), and the line 1 (2) can be combined into the 3-bit binary code "100", which represents four in decimal.

Since the pixel is the intersection crossed by the pixel electrode 31 and the line electrode 32, each pixel can correspond to one of the pixel electrodes 31 and one of the line electrodes 32. For example, the pixel of the first column and the first row may correspond to the pixel electrode 31 of the first column and the line electrode 32 of the first row.

The partial update control signal 101 includes at least one update control signal 1011 and at least one hold control signal 1012. The update control signal 1011 corresponds to the pixel waveform data 111 and the line waveform data 121 of the updating pixel. The hold control signal 1012 corresponds to the pixel waveform data and the line waveform data of the holding pixel. The pixel electrode driver signals include at least one pixel electrode refreshing signal and at least one pixel-electrode hold signal. The line electrode driver signals include at least one line electrode refreshing signal and at least one line-electrode hold signal.

In the embodiment, the update control signal 1011 is at a low voltage, and the hold control signal 1021 is at a high voltage.

For example, with reference to FIGS. 3A to 3C, the update control signal 1011 corresponds to the first pixel waveform data 1111 and the first line waveform data 1211. The hold control signal 1012 corresponds to the second to fourth pixel waveform data 1112-1114 and the second to fourth line waveform data 1212-1214.

Namely, the updating pixel is the intersection crossed by the pixel electrode 31 of the first column and the line electrode 32 of the first row. The holding pixels are the intersections crossed by the pixel electrodes 31 of the second to fourth columns and the line electrodes 32 of the second to fourth rows.

The driver circuit unit 20 outputs the pixel electrode refreshing signal and the line electrode refreshing signal to the pixel electrode 31 and the line electrode 32 of the updating pixel. The driver circuit unit 20 further outputs the pixel-electrode hold signal and the line-electrode hold signal to the pixel electrode 31 and the line electrode 32 of the holding pixels. Moreover, a voltage difference between update signals on the updating pixel is greater than or equal to a threshold voltage required to change a pixel state. The update signals on the updating pixel may include the pixel electrode refreshing signal and the line electrode refreshing signal on the updating pixel.

The multistable display can refresh partial image of the display panel unit without affecting a color difference of other pixels in the same column by outputting the pixel-electrode hold signal and the line-electrode hold signal to the pixel electrode and the line electrode corresponding to the holding pixel. Therefore, a problem of partial brightness and color difference caused by refreshing the partial image can be mitigated.

Namely, the multistable display only refreshes the updating pixel with the pixel electrode refreshing signal and the line electrode refreshing signal, and the multistable display maintains colors of the holding pixel with the pixel-electrode hold signal and the line-electrode hold signal.

In other words, the pixel-electrode hold signal and the line-electrode hold signal can maintain a color difference between the updating pixel and the holding pixel. In the embodiment, the pixel-electrode hold signal and the line-electrode hold signal are high impedance (HiZ) voltage signals or high frequency (HiF) voltage signals. Moreover, a voltage difference between the pixel-electrode hold signal and the line-electrode hold signal on the holding pixel is smaller than the pixel voltage state changing value.

The HiZ voltage signal means an open circuit voltage signal for stopping outputting voltage energy to the pixel. Furthermore, without needing to be refreshed, the holding pixel needs to maintain its original color. In other words, it is no longer necessary to provide voltage energy to the holding pixel to make a cholesterol liquid crystal of the holding pixel transition. Therefore, the driving circuit unit 20 outputs the HiZ voltage signal for stopping outputting the voltage energy to the holding pixel, such that the color of the holding pixel can be maintained.

The HiF voltage signal is a positive and negative fast alternating voltage signal with a high frequency. When the HiF voltage signal is outputted to the holding pixel, a cholesterol liquid crystal of the holding pixel can receive a positive and negative alternating voltage energy. In the case of the high frequency, a voltage signal level received by the cholesterol liquid crystal is equivalent to one signal level with a same voltage value. However, since a cholesterol liquid crystal of a ChLCD has a charge and discharge characteristic curve similar with a capacitor, the cholesterol liquid crystal of the ChLCD cannot continuously accumulate enough voltage energy for charging when the cholesterol liquid crystal receives the HiF voltage signal. Namely, the cholesterol liquid crystal cannot receive enough voltage energy to change state, and the holding pixel can maintain an original color without changing state, that is, no refreshing occurs.

Figures 4A, 4B, 4C:
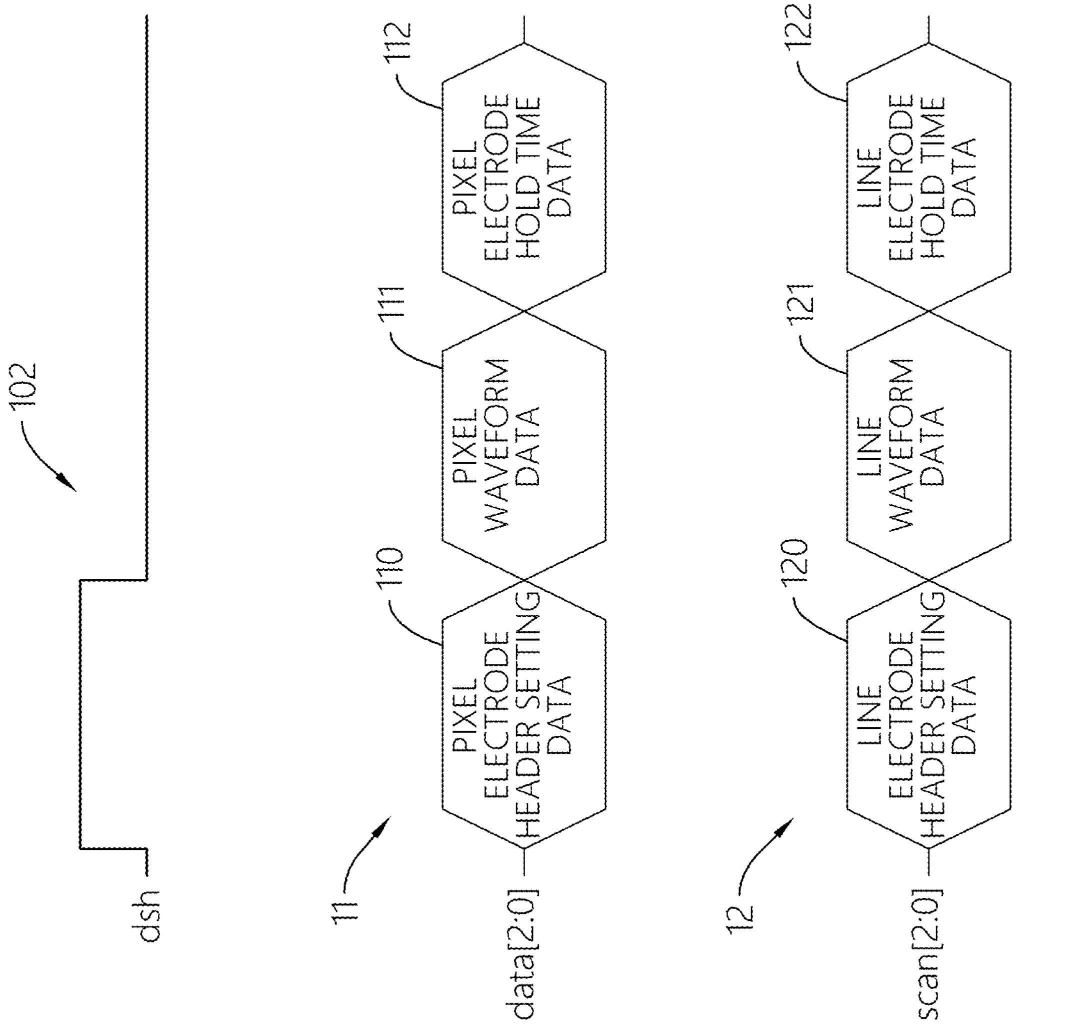
FIG. 4A is a schematic view of a header setting signal of the multistable display of the present invention.
FIG. 4B is a schematic view of the pixel waveform data of the multistable display of the present invention.
FIG. 4C is a schematic view of the line waveform data of the multistable display of the present invention.

With reference to FIGS. 4A to 4C, in a first embodiment, the data signals 11 include a pixel electrode header setting data 110 and the pixel waveform data 111.

When the driver circuit unit 20 receives the pixel electrode header setting data 110, the driver circuit unit 20 configures a data voltage truth table according to the pixel electrode header setting data 110. When the driver circuit unit 20 receives the pixel waveform data 111, the driver circuit unit 20 generates the pixel electrode driver signal according to the pixel waveform data 111 and the data voltage truth table.

The scan signals 12 include a line electrode header setting data 120 and the line waveform data 121. When the driver circuit unit 20 receives the line electrode header setting data 120, the driver circuit unit 20 configures a scan voltage truth table according to the line electrode header setting data 120. When the driver circuit unit 20 receives the line waveform data 121, the driver circuit unit 20 generates the line electrode driver signal according to the line waveform data 121 and the scan voltage truth table.

Moreover, the timing control signal further includes a header setting signal 102. When the data signals 11 are the pixel electrode header setting data 110 or when the scan signal 12 is the line electrode header setting data 120, the header setting signal 102 is at the high voltage. When the data signals 11 are the pixel waveform data 111 or when the scan signal 12 is the line waveform data 121, the header setting signal 102 is at the low voltage.

Figure 5:
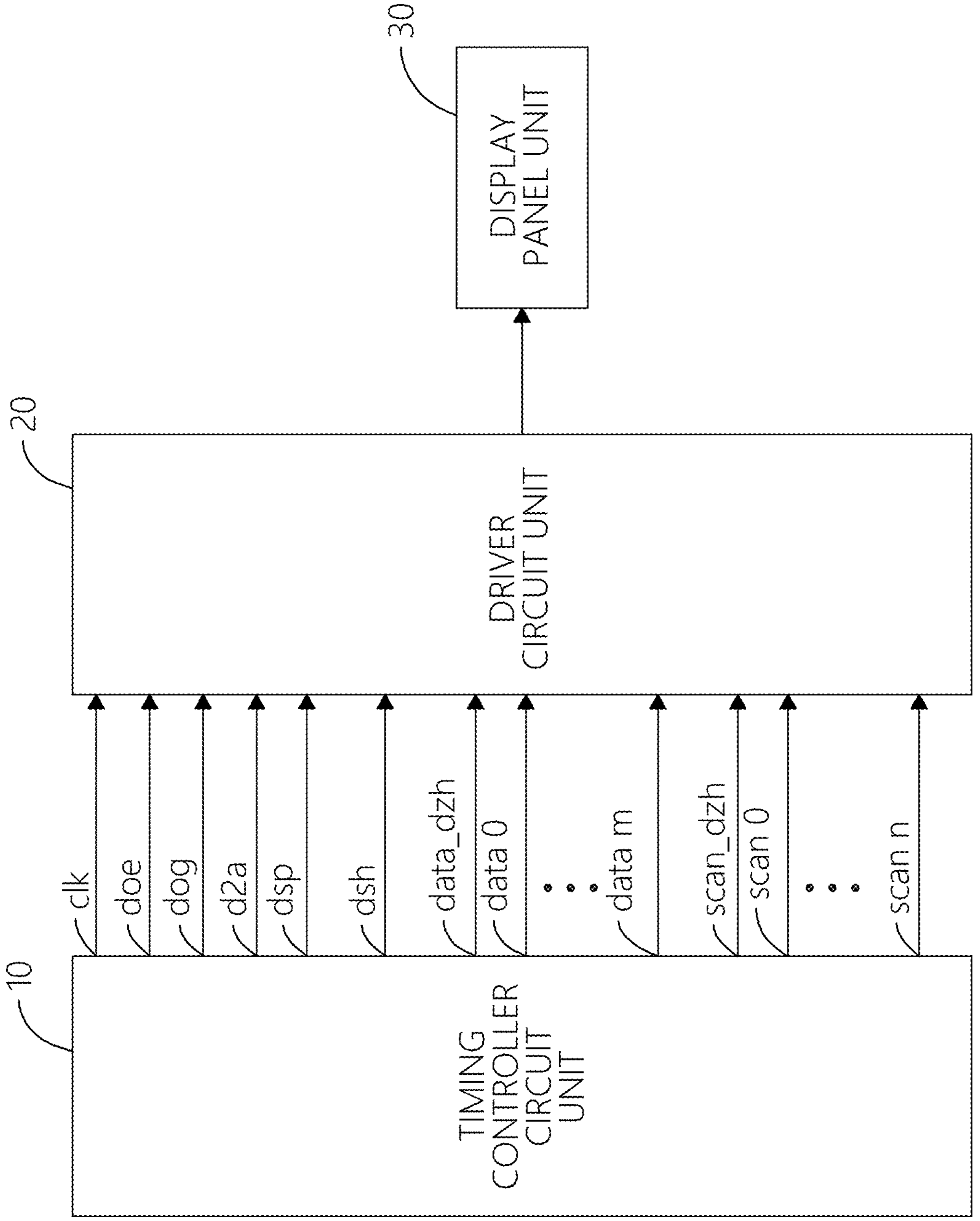
FIG. 5 is a block diagram of a second embodiment of the multistable display of the present invention.

With reference to FIG. 5, in the embodiment, the partial update signal control port (dzh) of the timing controller circuit unit 10 includes a data partial update signal control terminal (data_dzh) and a scan partial update signal control terminal (scan_dzh).

Figure 6A:
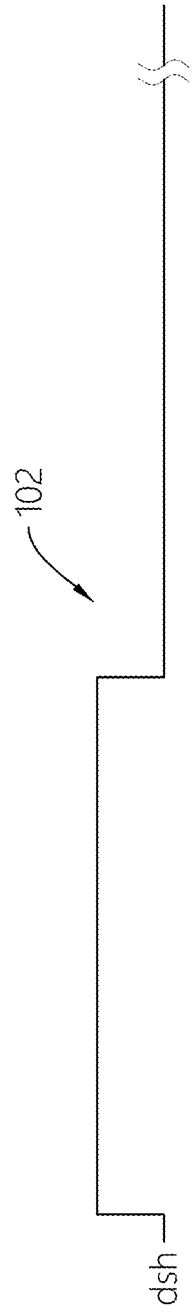
FIG. 6A is a schematic view of the header setting signal of the multistable display of the present invention.
Figure 6B:
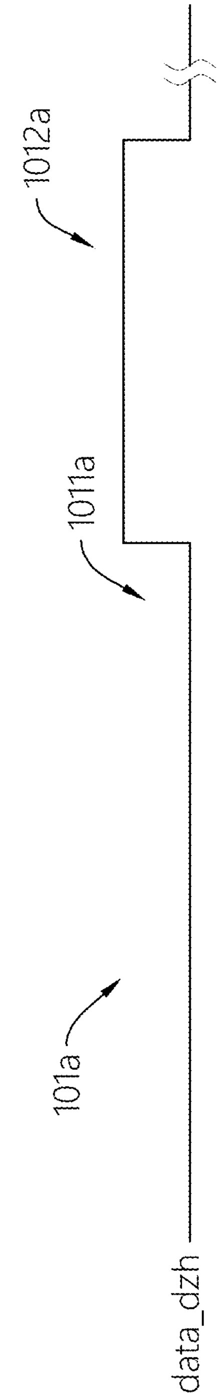
FIG. 6B is a schematic view of a data partial update control signal of the multistable display of the present invention.
Figure 6C:
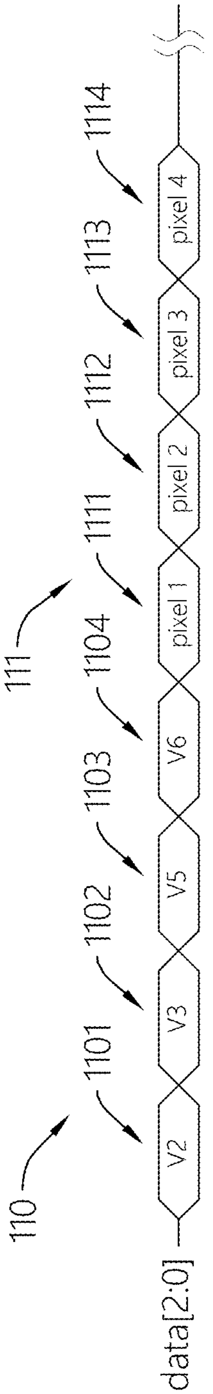
FIG. 6C is a schematic view of the pixel waveform data of the multistable display of the present invention.

With reference to FIGS. 6A to 6C, the data partial update signal control terminal (data_dzh) outputs a data partial update control signal 101*a*. The data partial update control signal 101*a* includes a data update control signal 1011*a* and a data hold control signal 1012*a*. According to the data partial update control signal 101*a*, the data update control signal 1011*a* corresponds to the first pixel waveform data 1111, and the data hold control signal 1012*a* corresponds to the second to fourth pixel waveform data 1112-1114. In other words, the driver circuit unit 20 generates the pixel electrode driver signal to the pixel electrode 31 of the first column, and generates the pixel electrode maintaining signals to the pixel electrodes 31 of the second to fourth columns.

Moreover, the driver circuit unit 20 configures outputs of the data voltage truth table according to a content of the pixel electrode header setting data 110. The driver circuit unit 20 further configures inputs of the data voltage truth table according to the pixel waveform data 111. Therefore, the driver circuit unit 20 can determine a voltage of the pixel electrode driver signal by checking the data voltage truth table. For example, the data voltage truth table can be obtained as shown in the following Table 1:

TABLE 1

| pixel waveform data (input) | voltage of pixel electrode driver signal (output) |
|---|---|
| 00 | V2 |
| 01 | V3 |
| 10 | V5 |
| 11 | V6 |

Figure 7A:
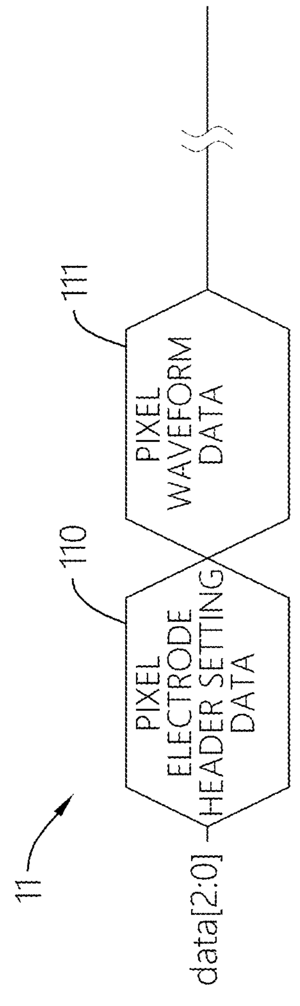
FIG. 7A is a schematic view of the pixel waveform data of the multistable display of the present invention.
Figure 7B:
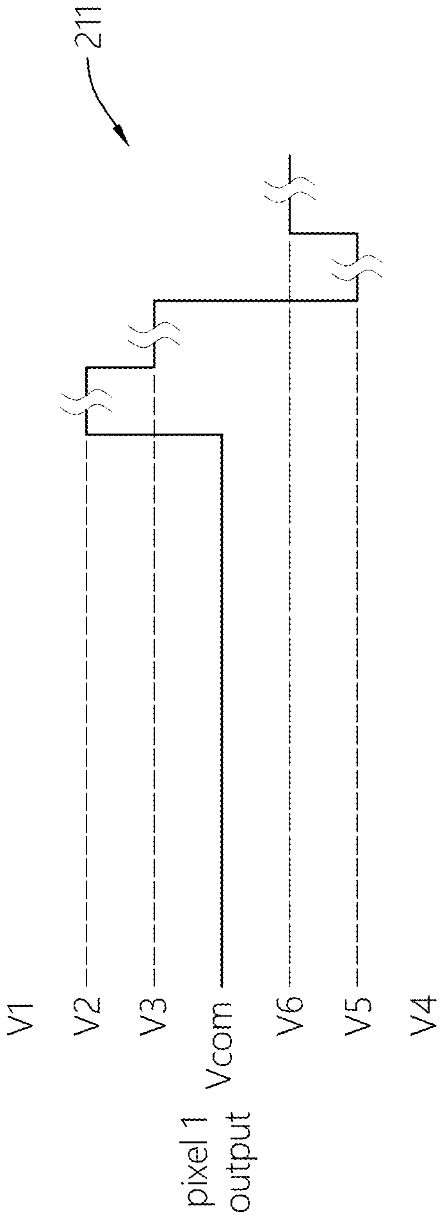
FIG. 7B is a schematic view of a pixel electrode driver signal of the multistable display of the present invention.

For example, with reference to FIGS. 6B and 6C, the pixel waveform data corresponding to the updating pixel is the first pixel waveform data 1111. With reference to FIGS. 7A and 7B, when the pixel waveform data, such as the first pixel waveform data 1111, is "00", the driver circuit unit 20 generates the pixel electrode driver signal 211 with a second voltage V2, and outputs the pixel electrode driver signal 211 with the second voltage V2 to the pixel electrode 31 of the first column. When the first pixel waveform data 1111 is "01", the driver circuit unit 20 generates and outputs the pixel electrode driver signal 211 with a third voltage V3 to the pixel electrode 31 of the first column. When the first pixel waveform data 1111 is "10", the driver circuit unit 20 generates and outputs the pixel electrode driver signal 211 with a fifth voltage V5 to the pixel electrode 31 of the first column. When the first pixel waveform data 1111 is "11", the driver circuit unit 20 generates and outputs the pixel electrode driver signal 211 with a sixth voltage V6 to the pixel electrode 31 of the first column.

Figures 8A, 8B, 8C:
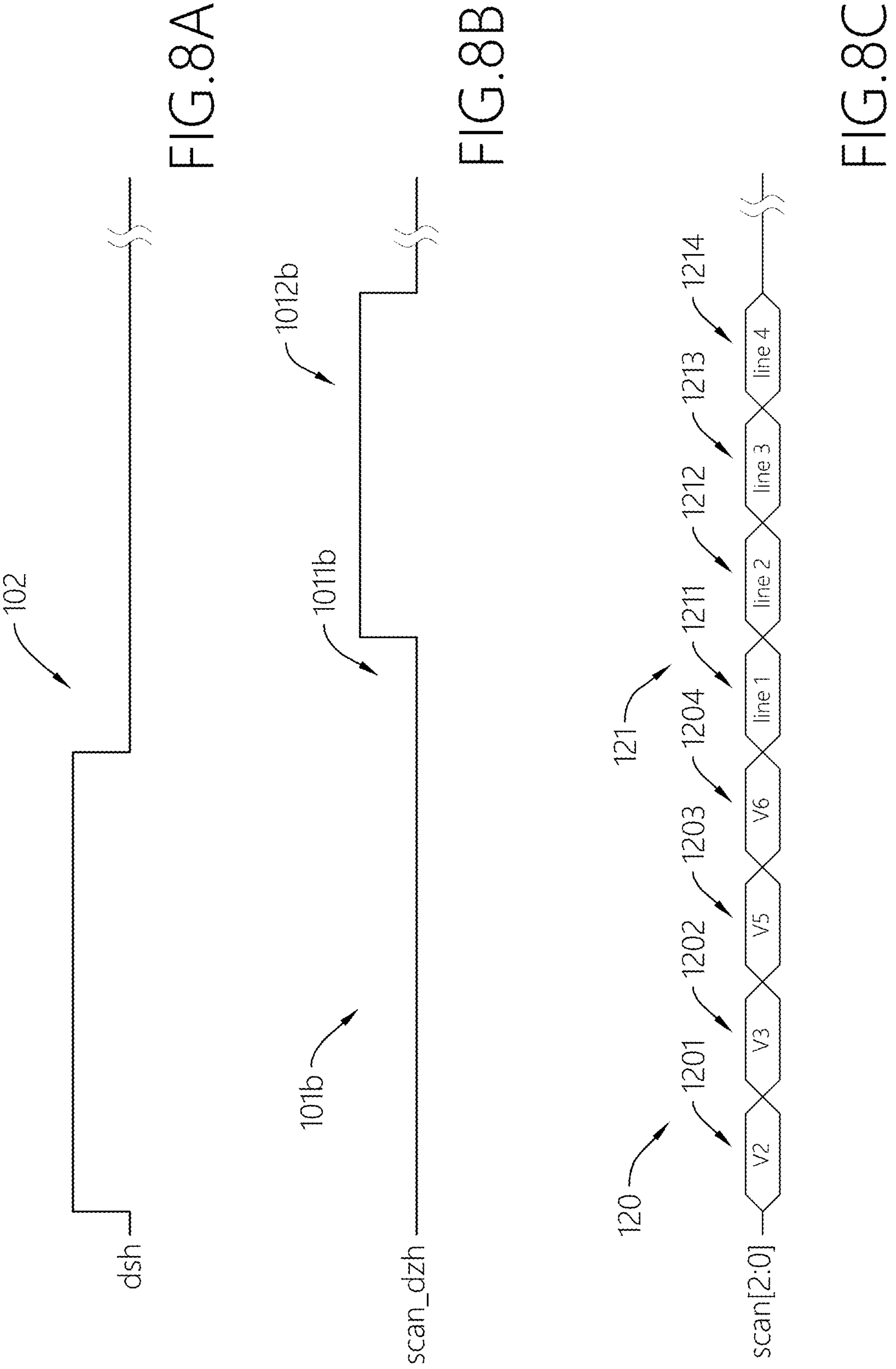
FIG. 8A is a schematic view of the header setting signal of the multistable display of the present invention.
FIG. 8B is a schematic view of a scan partial update control signal of the multistable display of the present invention.
FIG. 8C is a schematic view of the line waveform data of the multistable display of the present invention.

Similarly, with reference to FIGS. 8A to 8C, the scan partial update signal control terminal (scan_dzh) outputs a scan partial update control signal 101*b*. The scan partial update control signal 101*b* includes a scan update control signal 1011*b* and a scan hold control signal 1012*b*. According to the scan partial update control signal 101*b*, the scan update control signal 1011*b* corresponds to the first line waveform data 1211, and the scan hold control signal 1012*b* corresponds to the second to fourth line waveform data 1212-1214. In other words, the driver circuit unit 20 generates the line electrode driver signal to the line electrode 32 of the first row, and generates the line electrode maintaining signals to the line electrodes 32 of the second to fourth rows.

Moreover, the driver circuit unit 20 determines a line electrode waveform of the line electrode driver signal by checking the scan voltage truth table. For example, since the line electrode waveform of the line electrode driver signal is one of multiple fixed waveforms, outputs of the scan voltage truth table can be configured according to the multiple fixed waveforms. The driver circuit unit 20 further configures inputs of the scan voltage truth table according to the line waveform data 121. Therefore, the driver circuit unit 20 can determine the line electrode waveform of the line electrode driver signal by checking the scan voltage truth table. For example, a waveform A is a reset waveform (RESET), a waveform B is a display waveform (CDS), and the scan voltage truth table can be configured as shown in the following Table 2:

TABLE 2

| line waveform data input | waveform of line electrode driver signal (output) |
|---|---|
| 00 | waveform A |
| 01 | waveform B |

Figure 9A:
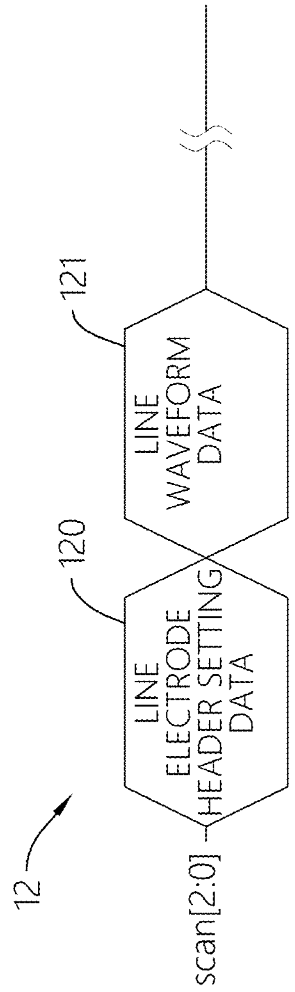
FIG. 9A is a schematic view of the line waveform data of the multistable display of the present invention.
Figure 9B:
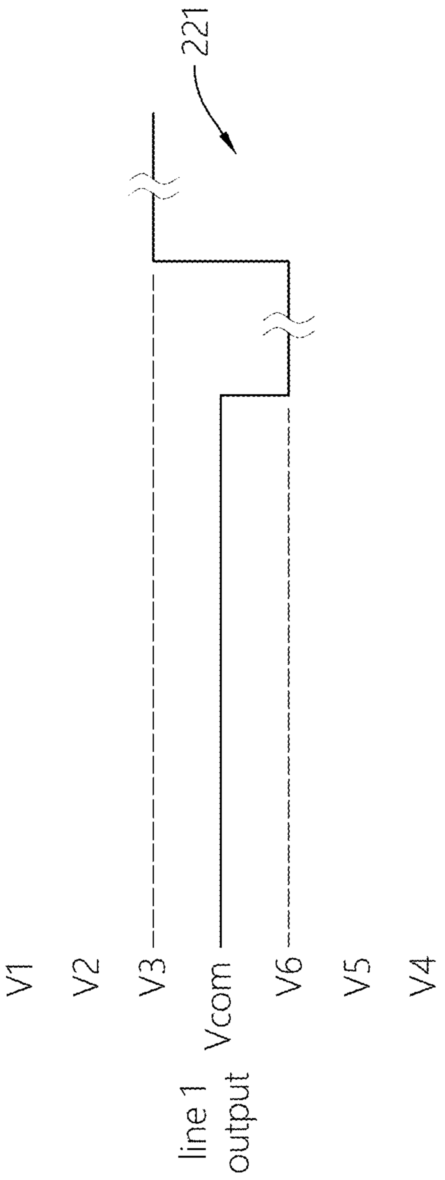
FIG. 9B is a schematic view of a line electrode driver signal of the multistable display of the present invention.

For example, with reference to FIGS. 8B and 8C, the refreshing line waveform data corresponding to the updating pixel is the first line waveform data 1211. With reference to FIGS. 9A and 9B, when the refreshing line waveform data, such as the first line waveform data 1211, is "01", the driver circuit unit 20 generates the line electrode driver signal 221 according to the waveform B. For example, the waveform B is a waveform that outputs the sixth voltage V6 first and then outputs the third voltage V3. The driver circuit unit 20 generates and outputs the line electrode driver signal 221 to the line electrode 32 of the first row.

With reference to FIG. 10C, in a second embodiment, the data signals 11 also include the pixel electrode header setting data 110 and the pixel waveform data 111. The driver circuit unit 20 determines a respective pixel electrode voltage of each of the pixel electrode driver signals according to the pixel electrode header setting data 110, and the driver circuit unit 20 determines a pixel driving time duration for outputting the pixel electrode driver signals having the pixel electrode voltages according to the pixel waveform data 111.

Figures 12A, 12B, 12C:
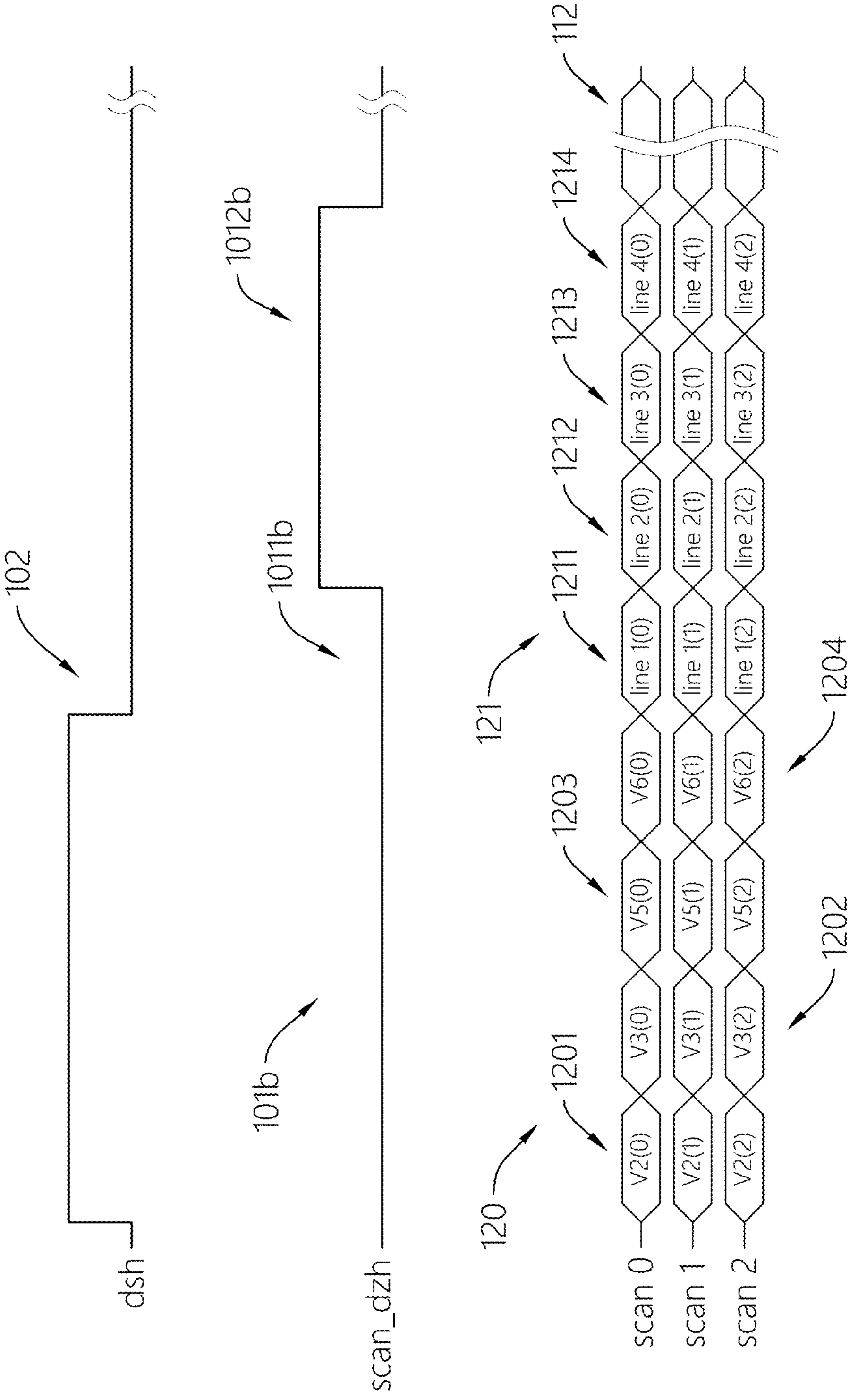
FIG. 12A is a schematic view of the header setting signal of the multistable display of the present invention.
FIG. 12B is a schematic view of the scan partial update control signal of the multistable display of the present invention.
FIG. 12C is a schematic view of the line waveform data of the multistable display of the present invention.

With reference to FIG. 12C, the scan signals 12 also include the line electrode header setting data 120 and the line waveform data 121. The driver circuit unit determines the line signal waveform of the line electrode driver signal according to the line waveform data 121.

Moreover, with reference to FIGS. 10A to 10C, the pixel electrode header setting data 110 includes a first pixel electrode positive voltage value 1101, a second pixel electrode positive voltage value 1102, a first pixel electrode negative voltage value 1103, and a second pixel electrode negative voltage value 1104.

The pixel waveform data 111 at least includes a refreshing pixel waveform data, and the refreshing pixel waveform data includes a updating pixel electrode voltage duty count. In the embodiment, the refreshing pixel waveform data is the first pixel waveform data 1111, and the updating pixel electrode voltage duty count is a first pixel electrode voltage duty count of the first pixel waveform data 1111. The driver circuit unit 20 includes a pixel electrode duty count, and the driver circuit unit 20 calculates a remaining voltage duty count of the updating pixel by subtracting the updating pixel electrode voltage duty count from the pixel electrode duty count. When the driver circuit unit 20 determines the pixel driving time duration according to the pixel waveform data 111, the driver circuit unit 20 configures a first pixel driving time duration according to the updating pixel electrode voltage duty count of the pixel waveform data 111, and the driver circuit unit 20 outputs the pixel electrode refreshing signal with the first pixel electrode positive voltage value 1101 to the updating pixel for the first pixel driving time duration. The driver circuit unit 20 configures a second pixel driving time duration according to the updating pixel electrode voltage duty count, and the driver circuit unit 20 outputs the pixel electrode refreshing signal with the second pixel electrode positive voltage value 1102 to the updating pixel for the second pixel driving time duration. The driver circuit unit 20 configures a third pixel driving time duration according to the updating pixel electrode voltage duty count, and the driver circuit unit 20 outputs the pixel electrode refreshing signal with the first pixel electrode negative voltage value 1103 to the updating pixel for the third pixel driving time duration. The driver circuit unit 20 configures a fourth pixel driving time duration according to the updating pixel electrode voltage duty count, and the driver circuit unit 20 outputs the pixel electrode refreshing signal with the second pixel electrode negative voltage value 1104 to the updating pixel for the fourth pixel driving time duration.

In the embodiment, the pixel electrode header setting data 110 includes a pixel electrode voltage data and a pixel electrode duty count data. The driver circuit unit 20 determines pixel electrode voltage value of the pixel electrode driver signal according to the pixel electrode voltage data of the pixel electrode header setting data 110. The driver circuit unit 20 further configures the pixel electrode duty count according to the pixel electrode duty count data of the pixel electrode header setting data 110.

For example, with reference to FIG. 1, the timing controller circuit unit 10 includes first to third data output ports (data 0-2). The pixel waveform data includes first to third pixel waveform data 1111-1113. An amount of the pixel waveform data corresponds to an amount of the pixel electrodes 31. In the embodiment, the display panel unit 30 includes 4 pixel electrodes 31.

In the embodiment, with reference to FIG. 10C, the first pixel electrode positive voltage value 1101 is first values of the first to third data output ports (data 0-2), and the first pixel electrode positive voltage value 1101 is presented in a 3-bit binary code, respectively as V2(0) to V2(2), for corresponding to a second voltage V2. The second pixel electrode positive voltage value 1102 is second values of the first to third data output ports (data 0-2), and the second pixel electrode positive voltage value 1102 is also presented in a 3-bit binary code, respectively as V3(0) to V3(2), for corresponding to a third voltage V3. The first pixel electrode negative voltage value 1103 is third values of the first to third data output ports (data 0-2), and the first pixel electrode negative voltage value 1103 is also presented in a 3-bit binary code, respectively as V5(0) to V5(2), for corresponding to a fifth voltage V5. The second pixel electrode negative voltage value 1104 is fourth values of the first to third data output ports (data 0-2), and the second pixel electrode negative voltage value 1104 is also presented in a 3-bit binary code, respectively as V6(0) to V6(2), for corresponding to a sixth voltage V6.

Moreover, the updating pixel electrode voltage duty count is values of the first to third data output ports (data 0-2), and the updating pixel electrode voltage duty count is presented in a 3-bit binary code. For example, the updating pixel corresponds to the first pixel waveform data 111, respectively as pixel 1 (0) to pixel 1 (2). Further, the second to fourth pixel waveform data 1112-1114 respectively include second to fourth pixel electrode voltage duty counts. Similarly, the second pixel electrode voltage duty count is values of the first to third data output ports (data 0-2), and is presented in a 3-bit binary code, respectively as pixel 2 (0) to pixel 2 (2). The third to fourth pixel electrode voltage duty counts can be obtained in the same way.

For example, the pixel electrode duty count is 7. When the first pixel electrode voltage duty count of the first pixel waveform data 1111 is "100", a corresponding decimal number is 4. As the driver circuit unit 20 subtracts the updating pixel electrode voltage duty count from the pixel electrode duty count, i.e. 7−4=3, the driver circuit unit 20 is able to calculate, obtain, and configure the remaining voltage duty count of the updating pixel as 3.

Figure 11A:
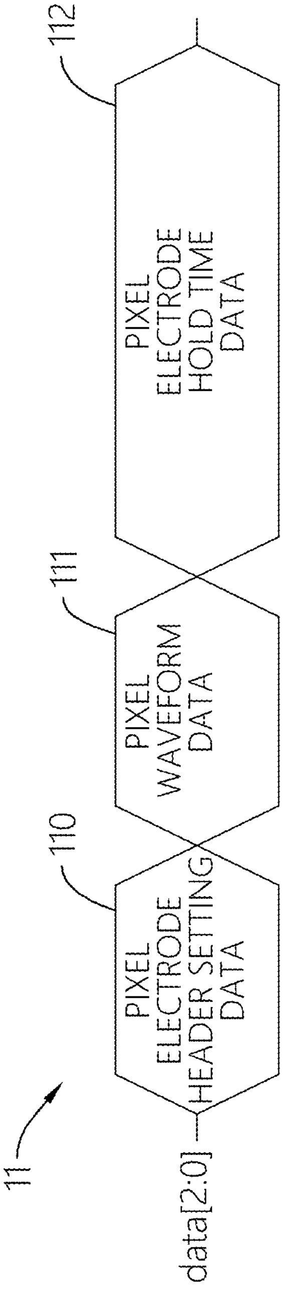
FIG. 11A is a schematic view of the pixel waveform data of the multistable display of the present invention.
Figure 11B:
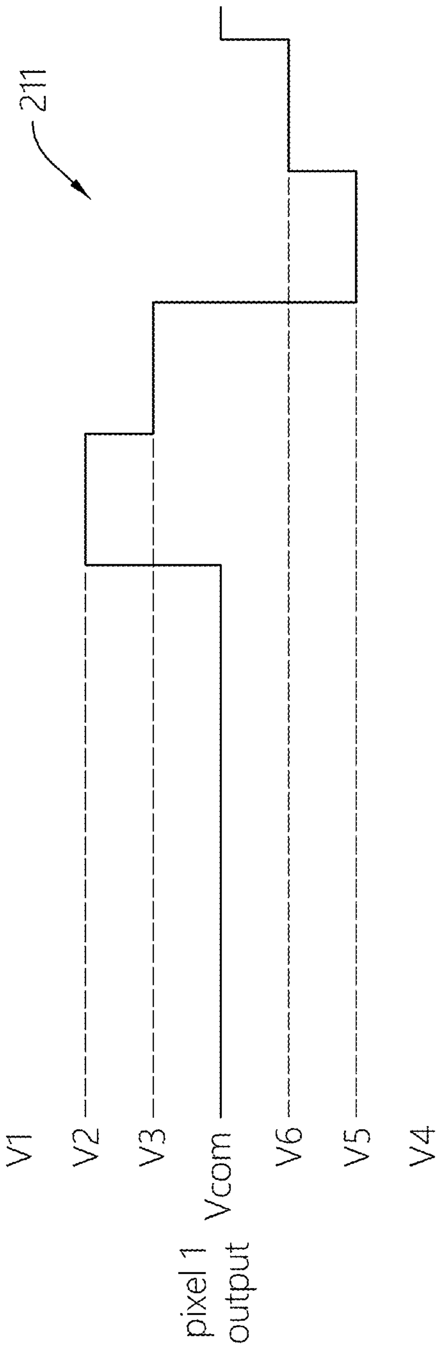
FIG. 11B is a schematic view of the pixel electrode driver signal of the multistable display of the present invention.

With reference to FIGS. 11A and 11B, when the updating pixel electrode voltage duty count is "100", the driver circuit unit 20 outputs the pixel electrode refreshing signal of the pixel electrode driver signal 211 with the first pixel electrode positive voltage value 1101, i.e. the second voltage V2, to the updating pixel for the first pixel driving time duration of 4 clocks of duty time. Moreover, since the pixel electrode duty count is 7, the remaining voltage duty count of the updating pixel is 3. The driver circuit unit 20 outputs the pixel electrode refreshing signal of the pixel electrode driver signal 211 with the second pixel electrode positive voltage value 1102, i.e. the third voltage V3, to the updating pixel for the second pixel driving time duration of 3 clocks of duty time. As the driver circuit unit 20 enters a negative half cycle, the driver circuit unit 20 outputs the pixel electrode refreshing signal of the pixel electrode driver signal 211 with the first pixel electrode negative voltage value 1103, i.e. the fifth voltage V5, to the updating pixel for the first pixel driving time duration of 4 clocks of duty time. Moreover, since the pixel electrode duty count is 7, the remaining voltage duty count of the updating pixel is 3. The driver circuit unit 20 outputs the pixel electrode refreshing signal of the pixel electrode driver signal 211 with the second pixel electrode negative voltage value 1104, i.e. the sixth voltage V6, to the updating pixel for the second pixel driving time duration of 3 clocks of duty time.

The driver circuit unit 20 determines a line electrode waveform of the line electrode driver signal according to the line waveform data 121. With reference to FIGS. 12A to 12C, the line waveform data 121 at least includes the refreshing line waveform data. In the embodiment, the refreshing line waveform data is the first line waveform data 1211. The driver circuit unit 20 determines the line electrode waveform of the line electrode driver signal outputted to the line electrode 32 of the first row according to the first line waveform data 1211.

In the embodiment, the line electrode header setting data 120 includes a scan voltage data and a line electrode duty count data. The driver circuit unit 20 configures the line electrode duty count according to the line electrode duty count data of the line electrode header setting data 120.

Figure 13A:
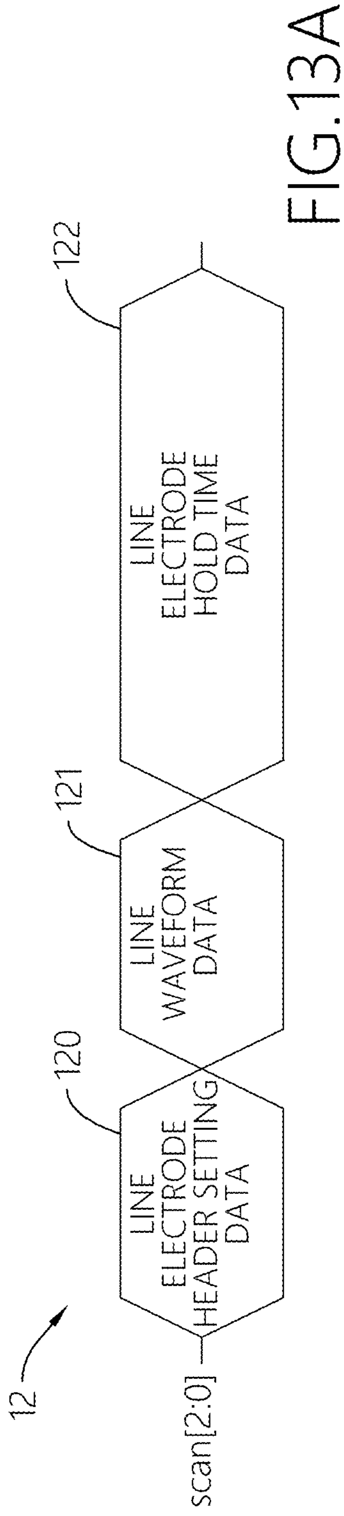
FIG. 13A is a schematic view of the line waveform data of the multistable display of the present invention.
Figure 13B:
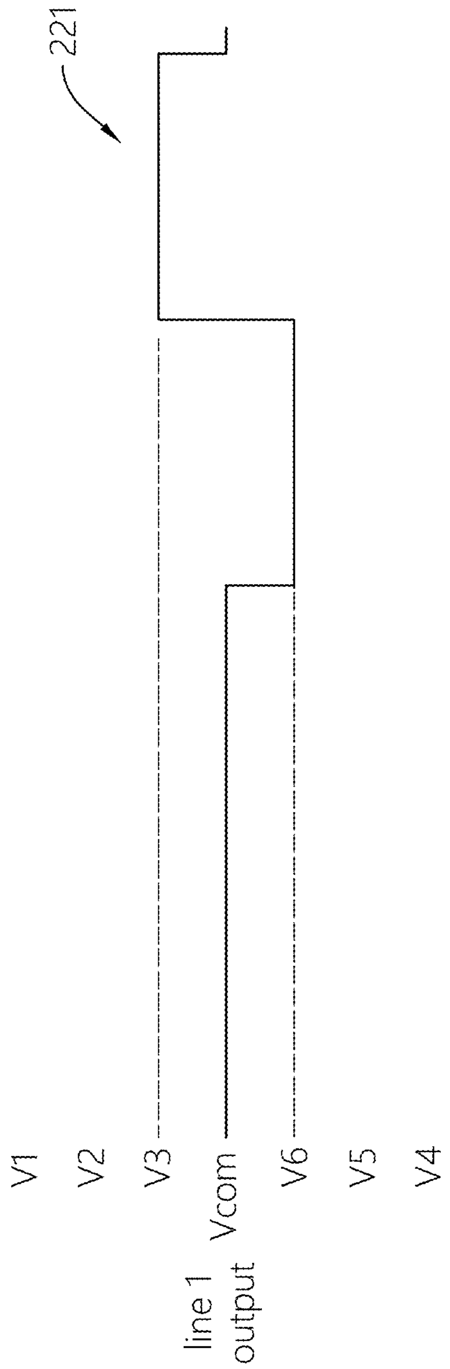
FIG. 13B is a schematic view of the line electrode driver signal of the multistable display of the present invention.

For example, with reference to FIGS. 13A and 13B, the refreshing line waveform data is the first line waveform data. When the refreshing line waveform data is "100", the driver circuit unit 20 determines the line electrode waveform of the line electrode driver signal 221 is firstly outputting the sixth voltage V6 and secondly outputting the third voltage V3, and a ratio of a first time duration for outputting the sixth voltage V6 to a second time duration for outputting the third voltage V3 is 1:1. Further, the driver circuit unit 20 outputs the line electrode driver signal 221 to the updating pixel. If the line electrode duty count is 7, the driver circuit unit 20 firstly outputs the line electrode driver signal 221 with the sixth voltage V6 to the updating pixel for 7 clocks of duty time. As the driver circuit unit 20 enters a negative half cycle, the driver circuit unit 20 secondly outputs the line electrode driver signal 221 with the third voltage V3 to the updating pixel for 7 clocks of duty time.

Moreover, with reference to FIG. 5, in a third embodiment, the timing controller circuit unit 10 further includes a digital to analog (d2*a*) control port, and the d2*a* control port outputs a d2*a* conversion signal.

Figure 14A:
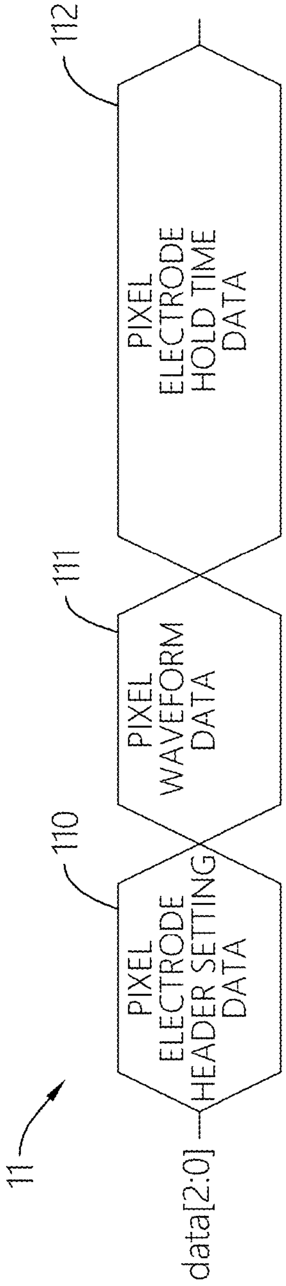
FIG. 14A is a schematic view of a pixel waveform data of the multistable display of the present invention.
Figure 14B:
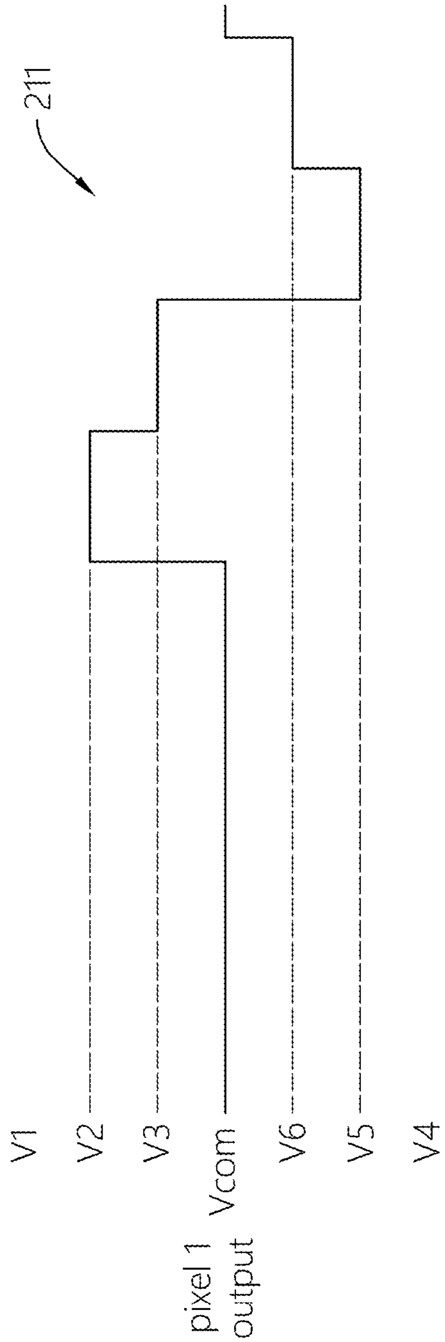
FIG. 14B is a schematic view of a pixel electrode driver signal of the multistable display of the present invention.
Figure 14C:
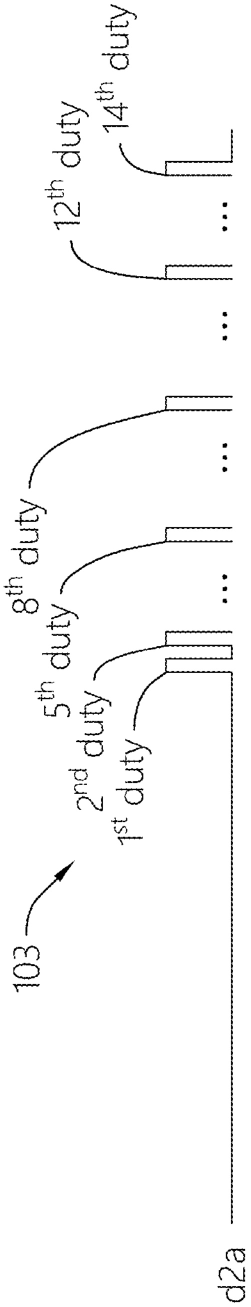
FIG. 14C is a schematic view of a digital to analog conversion signal of the multistable display of the present invention.

With reference to FIGS. 14A to 14C, the data signals 11 further include a pixel electrode hold time data 112, and the pixel electrode hold time data 112 is subsequent to the pixel waveform data 111.

The timing control signal further includes the d2*a* conversion signal 103. When the data signals 11 are the pixel electrode hold time data 112, the d2*a* data has a plurality of duties, and a number of the duties is even multiples of the pixel electrode duty count.

With reference to FIG. 10C, the pixel electrode header setting data 110 includes a first pixel electrode positive voltage value 1101, a second pixel electrode positive voltage value 1102, a first pixel electrode negative voltage value 1103, and a second pixel electrode negative voltage value 1104. The pixel waveform data 111 at least includes a refreshing pixel waveform data, and the refreshing pixel waveform data at least includes a updating pixel electrode voltage duty count. The refreshing pixel waveform data corresponds to the updating pixel. In the embodiment, the refreshing pixel waveform data is the first pixel waveform data 1111, and the updating pixel electrode voltage duty count is a first pixel electrode voltage duty count.

With reference to FIGS. 14A to 14C, when the driver circuit unit 20 determines the pixel driving time duration according to the pixel waveform data 111, the driver circuit unit 20 outputs the pixel electrode refreshing signal of the pixel electrode driver signal 211 with the first pixel electrode positive voltage value 1101 to the updating pixel for a time when the driver circuit unit 20 receives a $1^{st}$ duty of the d2*a* conversion signal 103 to an "$A^{th}$" duty of the d2*a* conversion signal 103. The driver circuit unit 20 outputs the pixel electrode refreshing signal of the pixel electrode driver signal 211 with the second pixel electrode positive voltage value 1102 to the updating pixel for a time when the driver circuit unit 20 receives an "$(A+1)^{th}$" duty of the d2*a* conversion signal 103 to a "$B^{th}$" duty of the d2*a* conversion signal 103. The driver circuit unit 20 outputs the pixel electrode refreshing signal of the pixel electrode driver signal 211 with the first pixel electrode negative voltage value 1103 to the updating pixel for a time when the driver circuit unit 20 receives a "$(B+1)^{th}$" duty of the d2*a* conversion signal 103 to an "$(A+B)^{th}$" duty of the d2*a* conversion signal 103. The driver circuit unit 20 outputs the pixel electrode refreshing signal of the pixel electrode driver signal 211 with the second pixel electrode negative voltage value to the updating pixel for a time when the driver circuit unit 20 receives an "$(A+B+1)^{th}$" duty of the d2*a* conversion signal 103 to a "$(2B)^{th}$" duty of the d2*a* conversion signal 103.

In the embodiment, "A" is the updating pixel electrode duty count, and "B" is the pixel electrode duty count.

For example, with reference to FIG. 10C, the updating pixel electrode voltage duty count is the first pixel electrode voltage duty count (pixel 1 (0)~pixel 1 (2)) of the first pixel waveform data 1111. When the updating pixel electrode voltage duty count is "100", the driver circuit unit 20 outputs the pixel electrode driver signal 211 with the first pixel electrode positive voltage value 1101, i.e. the second voltage V2, to the updating pixel for the first pixel driving time duration of 4 clocks of duty time. Therefore, with reference to FIGS. 14A to 14C, the driver circuit unit 20 outputs the pixel electrode driver signal 211 with the first pixel electrode positive voltage value 1101, i.e. the second voltage V2, to the updating pixel for a time when the driver circuit unit 20 receives a $1^{st}$ duty of the d2*a* conversion signal 103 to a $4^{th}$ duty of the d2*a* conversion signal 103. The driver circuit unit 20 outputs the pixel electrode driver signal 211 with the second pixel electrode positive voltage value 1102, i.e. the third voltage V3, to the updating pixel for a time when the driver circuit unit 20 receives a $5^{th}$ duty of the d2*a* conversion signal 103 to a $7^{th}$ duty of the d2*a* conversion signal 103. As the driver circuit unit 20 enters a negative half cycle, the driver circuit unit 20 outputs the pixel electrode driver signal 211 with the first pixel electrode negative voltage value 1103, i.e. the fifth voltage V5, to the updating pixel for a time when the driver circuit unit 20 receives an $8^{th}$ duty of the d2*a* conversion signal 103 to an $11^{th}$ duty of the d2*a* conversion signal 103. The driver circuit unit 20 outputs the pixel electrode driver signal 211 with the second pixel electrode negative voltage value 1102, i.e. the sixth voltage V6, to the updating pixel for a time when the driver circuit unit 20 receives a $12^{th}$ duty of the d2*a* conversion signal 103 to a $14^{th}$ duty of the d2*a* conversion signal 103. In the embodiment, the driver circuit unit 20 outputs the pixel electrode driver signal 211 to the pixel electrode 31 corresponding to the updating pixel. For example, the pixel electrode 31 corresponding to the updating pixel is the pixel electrode 31 of the first column. The driver circuit unit 20 outputs the pixel-electrode hold signal to other pixel electrodes 31. For example, the driver circuit unit 20 outputs the HiZ voltage signal or the HiF voltage signal to the pixel electrode 31 of the second to fourth columns.

Figure 15A:
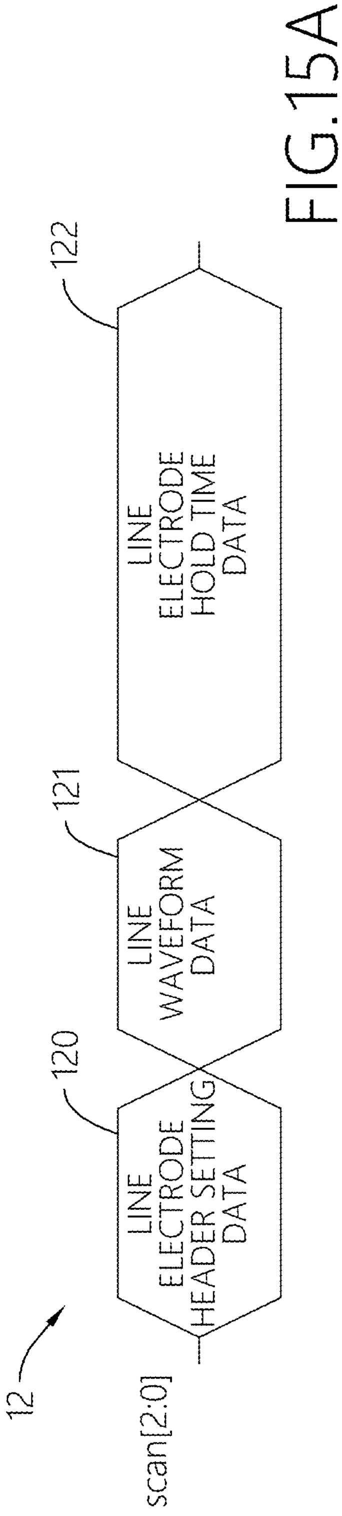
FIG. 15A is a schematic view of a line waveform data of the multistable display of the present invention.
Figure 15B:
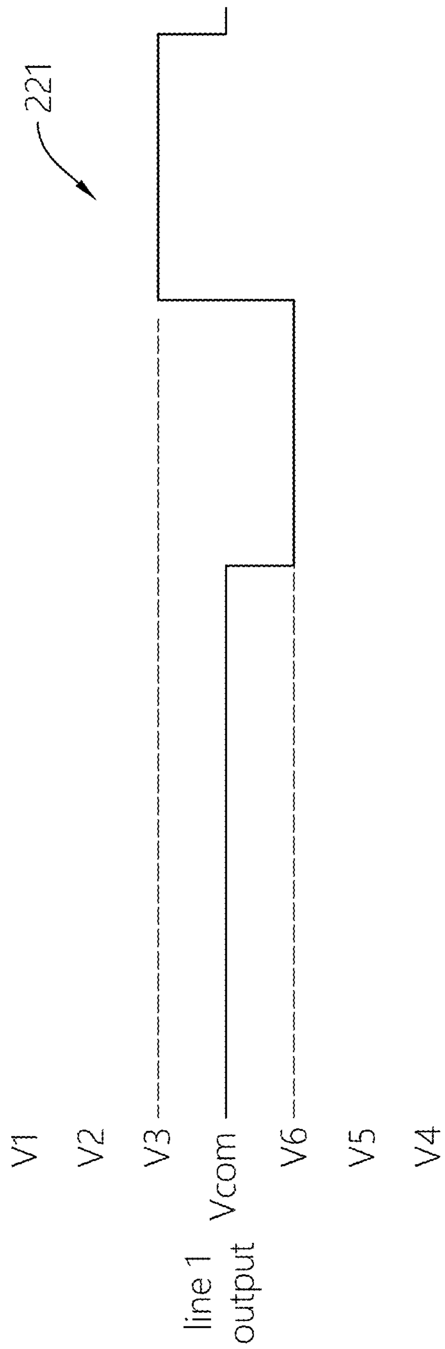
FIG. 15B is a schematic view of a line electrode driver signal of the multistable display of the present invention.
Figure 15C:
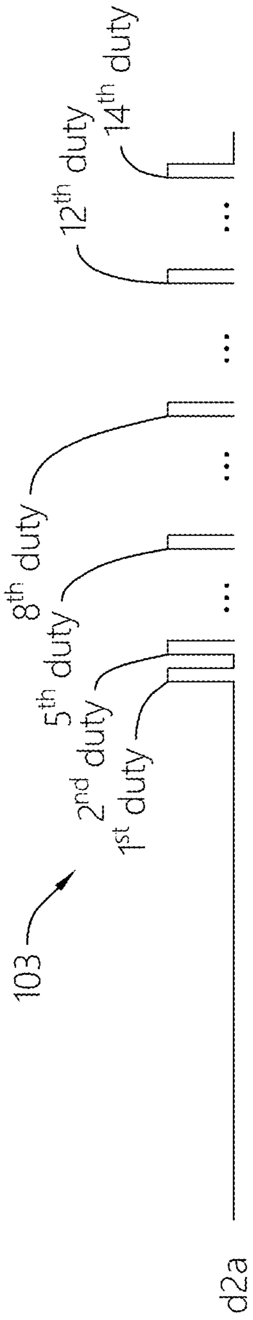
FIG. 15C is a schematic view of the digital to analog conversion signal of the multistable display of the present invention.
Figure 16:
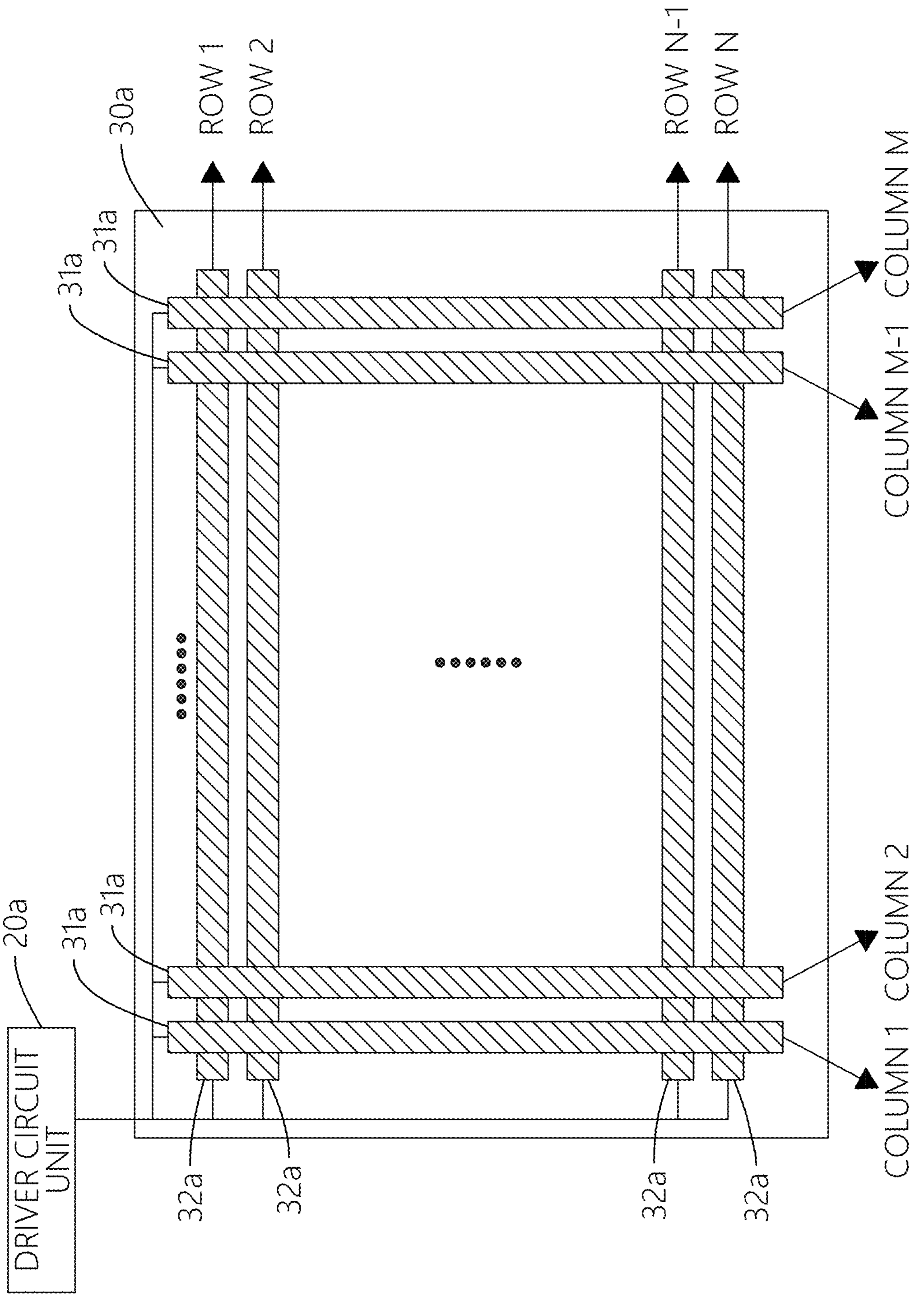
FIG. 16 is a schematic view of a panel structure of a conventional ChLCD.
Figure 17:
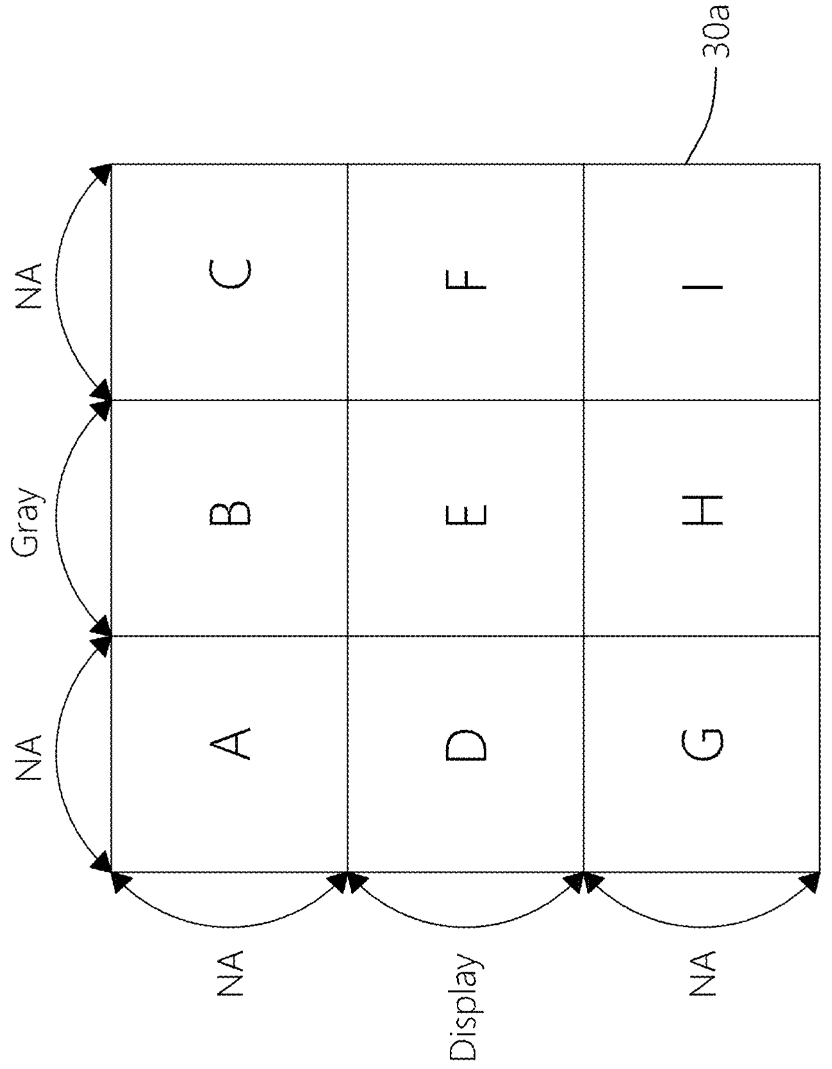
FIG. 17 is a schematic view of a nine-square grid of the panel structure of the conventional ChLCD.

The driver circuit unit 20 determines the line electrode waveform of the line electrode driver signal according to the line waveform data 121. With reference to FIG. 12C, the refreshing line waveform data is the first line waveform data. When the refreshing line waveform data is "100", the driver circuit unit 20 determines the line electrode waveform of the line electrode driver signal 221 is firstly outputting the sixth voltage V6 and secondly outputting the third voltage V3, and a ratio of a first time duration for outputting the sixth voltage V6 to a second time duration for outputting the third voltage V3 is 1:1. Further, the driver circuit unit 20 outputs the line electrode driver signal 221 to the updating pixel. With reference to FIGS. 15A to 15C, if the line electrode duty count is 7, the driver circuit unit 20 firstly outputs the line electrode driver signal 221 with the sixth voltage V6 to the updating pixel for a time when the driver circuit unit 20 receives a $1^{st}$ duty of the d2*a* conversion signal 103 to a $7^{th}$ duty of the d2*a* conversion signal 103. As the driver circuit unit 20 enters a negative half cycle, the driver circuit unit 20 secondly outputs the line electrode driver signal 221 with the third voltage V3 to the updating pixel for a time when the driver circuit unit 20 receives an $8^{th}$ duty of the d2*a* conversion signal 103 to a $14^{th}$ duty of the d2*a* conversion signal 103. In the embodiment, the driver circuit unit 20 outputs the line electrode driver signal 221 to the line electrode 32 corresponding to the updating pixel. For example, the line electrode 32 corresponding to the updating pixel is the line electrode 32 of the first row.

Moreover, in the multistable display with the partial update mode of the present invention, the d2*a* conversion signal 103 outputted by the d2*a* control port is utilized for counting, and the data signal output port of the present invention only needs to finish transporting the waveform data before the first duty arrives with a rising voltage. As a result, once the waveform data for the last frame is outputted, the data signal output port no longer needs to output more waveform data. In other words, once the waveform data for the last frame is outputted, for a time duration of the d2*a* control port outputting the d2*a* conversion signal 103, the data signal output port no longer needs to output more waveform data. For example, suppose that a last frame's voltage waveform occupies 4 duties, the data signal output port needs to finish transporting the last frame's voltage waveform before the first duty arrives with a rise of voltage level. For a time duration of the d2*a* control port outputting the first duty to the fourth duty for the last frame, the data signal output port no longer needs to output more waveform data.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multistable display with a partial update mode, comprising:

a timing controller circuit unit, generating a timing control signal;

a display panel unit, comprising a plurality of pixel electrodes and a plurality of line electrodes; wherein each intersection crossed by each pixel electrode and each line electrode forms a respective pixel, and the pixels comprise a updating pixel and a holding pixel;

a driver circuit unit, connected to the timing controller circuit unit and the display panel unit to receive the timing control signal, generating a plurality of pixel electrode driver signals to the pixel electrodes of the display panel unit, and generating a plurality of line electrode driver signals to the line electrodes of the display panel unit;

wherein the timing control signal comprises a partial update control signal, a plurality of data signals, and a plurality of scan signals; wherein the data signals comprise a plurality of pixel waveform data, and the pixel waveform data respectively correspond to the pixel electrodes; wherein the scan signals comprise a plurality of line waveform data, and the line waveform data respectively correspond to the line electrodes;

wherein the partial update control signal comprises a update control signal and a hold control signal, the update control signal corresponds to the pixel waveform data of the pixel electrode of the updating pixel and the line waveform data of the line electrode of the updating pixel, and the hold control signal corresponds to the pixel waveform data of the pixel electrode of the holding pixel and the line waveform data of the line electrode of the holding pixel;

wherein the pixel electrode driver signals comprise a pixel electrode refreshing signal and a pixel-electrode hold signal, and the line electrode driver signals comprise a line electrode refreshing signal and a line-electrode hold signal;

wherein the driver circuit unit outputs the pixel electrode refreshing signal to the pixel electrodes of the updating pixel, and outputs the line electrode refreshing signal to the line electrodes of the updating pixel;

wherein the driver circuit unit outputs the pixel-electrode hold signal to the pixel electrodes of the holding pixel, and outputs the line-electrode hold signal to the line electrodes of the holding pixel;

wherein a voltage difference between the pixel electrode refreshing signal and the line electrode refreshing signal on the updating pixel is greater than or equal to a threshold voltage required to change a pixel state.

2. The multistable display as claimed in claim 1, wherein the update control signal is at a low voltage, and the hold control signal is at a high voltage.

3. The multistable display as claimed in claim 2, wherein the pixel-electrode hold signal and the line-electrode hold signal are high impedance (HiZ) voltage signals.

4. The multistable display as claimed in claim 2, wherein the pixel-electrode hold signal and the line-electrode hold signal are high frequency (HiF) voltage signals.

5. The multistable display as claimed in claim 1, wherein the data signals comprise a pixel electrode header setting data and the pixel waveform data;

wherein when the driver circuit unit receives the pixel electrode header setting data, the driver circuit unit configures a data voltage truth table according to the pixel electrode header setting data;

wherein when the driver circuit unit receives the pixel waveform data, the driver circuit unit generates the pixel electrode driver signals according to the pixel waveform data and the data voltage truth table.

6. The multistable display as claimed in claim 5, wherein the timing control signal further comprises a header setting signal;

wherein when the data signals are the pixel electrode header setting data, the header setting signal is at the high voltage.

7. The multistable display as claimed in claim 1, wherein the data signals comprise a pixel electrode header setting data and the pixel waveform data;

wherein the driver circuit unit determines a respective pixel electrode voltage of each of the pixel electrode driver signals according to the pixel electrode header setting data, and the driver circuit unit determines a pixel driving time duration for outputting the pixel electrode driver signals having the pixel electrode voltages according to the pixel waveform data.

8. The multistable display as claimed in claim 7, wherein the pixel electrode header setting data comprise a first pixel electrode positive voltage value, a second pixel electrode positive voltage value, a first pixel electrode negative voltage value, and a second pixel electrode negative voltage value;

wherein the pixel waveform data at least comprises a refreshing pixel waveform data, and the refreshing pixel waveform data comprises a updating pixel electrode voltage duty count;

wherein the driver circuit unit comprises a pixel electrode duty count, and the driver circuit unit calculates a remaining voltage duty count of the updating pixel by subtracting the updating pixel electrode voltage duty count from the pixel electrode duty count;

wherein when the driver circuit unit determines the pixel driving time duration according to the pixel waveform data, the driver circuit unit configures a first pixel driving time duration according to the updating pixel electrode voltage duty count of the pixel waveform data, and the driver circuit unit outputs the pixel electrode refreshing signal with the first pixel electrode positive voltage value to the updating pixel for the first pixel driving time duration;

wherein the driver circuit unit configures a second pixel driving time duration according to the updating pixel electrode voltage duty count, and the driver circuit unit outputs the pixel electrode refreshing signal with the second pixel electrode positive voltage value to the updating pixel for the second pixel driving time duration;

wherein the driver circuit unit configures a third pixel driving time duration according to the updating pixel electrode voltage duty count, and the driver circuit unit outputs the pixel electrode refreshing signal with the first pixel electrode negative voltage value to the updating pixel for the third pixel driving time duration;

wherein the driver circuit unit configures a fourth pixel driving time duration according to the updating pixel electrode voltage duty count, and the driver circuit unit outputs the pixel electrode refreshing signal with the second pixel electrode negative voltage value to the updating pixel for the fourth pixel driving time duration.

9. The multistable display as claimed in claim 7, wherein the data signals comprise a pixel electrode hold time data, and the pixel electrode hold time data is subsequent to the pixel waveform data;

wherein the driver circuit unit comprises a pixel electrode duty count;

wherein the timing control signal comprises a digital to analog conversion signal;

wherein when the data signals are the pixel electrode hold time data, the digital to analog conversion signal has a plurality of duties, and a number of the duties is even multiples of the pixel electrode duty count.

10. The multistable display as claimed in claim 9, wherein the pixel electrode header setting data comprise a first pixel electrode positive voltage value, a second pixel electrode positive voltage value, a first pixel electrode negative voltage value, and a second pixel electrode negative voltage value;

wherein the pixel waveform data at least comprises a refreshing pixel waveform data, and the refreshing pixel waveform data comprises a updating pixel electrode voltage duty count;

when the driver circuit unit determines the pixel driving time duration according to the pixel waveform data, the driver circuit unit outputs the pixel electrode refreshing signal with the first pixel electrode positive voltage value to the updating pixel for a time when the driver circuit unit receives a $1^{st}$ duty of the digital to analog conversion signal to an $A^{th}$ duty of the digital to analog conversion signal;

wherein the driver circuit unit outputs the pixel electrode refreshing signal with the second pixel electrode positive voltage value to the updating pixel for a time when the driver circuit unit receives an $(A+1)^{th}$ duty of the digital to analog conversion signal to a $B^{th}$ duty of the digital to analog conversion signal;

wherein the driver circuit unit outputs the pixel electrode refreshing signal with the first pixel electrode negative voltage value to the updating pixel for a time when the driver circuit unit receives a $(B+1)^{th}$ duty of the digital to analog conversion signal to an $(A+B)^{th}$ duty of the digital to analog conversion signal;

wherein the driver circuit unit outputs the pixel electrode refreshing signal with the second pixel electrode negative voltage value to the updating pixel for a time when the driver circuit unit receives an $(A+B+1)^{th}$ duty of the digital to analog conversion signal to a $(2B)^{th}$ duty of the digital to analog conversion signal;

wherein A is the updating pixel electrode duty count, and B is the pixel electrode duty count.

* * * * *